3,465,043
Patented Sept. 2, 1969

3,465,043
METHOD FOR THE PRODUCTION OF 2-BUTENAL
David C. Lini, Media, Kermit C. Ramey, Springfield, and William B. Wise, Glenolden, Pa., assignors to Atlantic Richfield Company, Philadelphia, Pa., a corporation of Pennsylvania
No Drawing. Filed Jan. 24, 1968, Ser. No. 700,032
Int. Cl. C07c 47/26, 47/20
U.S. Cl. 260—601                        10 Claims

ABSTRACT OF THE DISCLOSURE
Method for the production of 2-butenal by the catalytic isomerization of butadiene monoepoxide in the presence of a rhodium-containing catalyst.

BACKGROUND OF THE INVENTION
Field of the invention
This invention relates to a method for the isomerization of butadiene monoepoxide to produce 2-butenal by the use of a rhodium-containing catalyst.

Prior art
No prior art is known which relates to the method of the instant invention.

SUMMARY OF THE INVENTION
In accordance with the present invention butadiene monoepoxide is isomerized to 2-butenal by contacting the monoepoxide at a temperature of from about 25° C. to 70° C. in the presence of a rhodium-containing catalyst such as bis-carbonyl rhodium chloride dimer (I) or rhodium chloride trihydrate (III). The numerals refer to the valence state of the rhodium.

It is an object of this invention therefore to provide a method for the isomerization of butadiene monoepoxide to 2-butenal.

It is another object of this invention to provide a method for the isomerization of butadiene monoepoxide to 2-butenal utilizing a rhodium-containing catalyst.

Other objects of this invention will be apparent from the description of the preferred embodiments and from the claims.

DESCRIPTION OF THE PREFERRED EMBODIMENTS

In carying out the process of this invention butadiene monoepoxide is contacted with a rhodium-containing catalyst at a temperature in the range of from about 25° C. to 70° C. Since the reaction is extremely slow at room temperature, i.e. about 25° C. it is preferred to carry out the contacting at from about 60° C. to 70° C.

Although it is unnecessary to employ a solvent, a solvent such as methanol or a mixture of methanol with water can be used and the mixture of catalyst solvent and butadiene monoepoxide can be heated to reflux temperatures. The use of a solvent such as methanol or methanol and water offers a convenient method for controlling the reaction temperature to within the desired range since the boiling point will be about 65° C. Temperatures above 65° C. can be obtained with these solvents by the use of superatmospheric pressures. However, temperatures above 70° C. are to be avoided since at these temperatures the reaction is primarily one of decarbonylation and propylene is produced by the removal of the carbonyl group. If other solvents are employed, for example benzene, care should be exericised to avoid temperatures above 70° C. and preferably temperatures below 70° C. should be used, i.e. 65° to 68° C.

It is know that 2-butenal can exist either in the trans-form or the cis- form. Crotonaldehyde is frequently thought to be the trans- form of 2-butenal. It has been found that both geometric isomers can be produced by the method of this invention.

Any rhodium compound can be utilized as the catalyst, for example, the simple compounds such as rhodium chloride trihydrate (III), $RhCl_3 \cdot 3H_2O$; rhodium nitrate (I) $Rh(NO_3)_3$; rhodium sulfate (I) $Rh_2(SO_4)_3 \cdot 12H_2O$ (and the other hydrates); rhodium sulfite (I) $Rh_2(SO_3)_3$ and the like, or the complex compounds such as bis-carbonyl rhodium chloride dimer (I) $[(CO)_2RhCl]_2$; the bis-allyl rhodium chloride dimer (I) $[(allyl)_2RhCl]_2$; the tris-triphenyl phosphine rhodium chloride (I)

$$(\phi P)_3 RhCl$$

the rhodium hexacyano-complex salts such as $$K_3[Rh(CN)_6]$$

and like complex compounds.

The following examples are provided for the purpose of illustrating the invention but they should not be construed as limiting.

Example I
To a flask provided with a thermometer and reflux condenser was added 2 ml. of butadiene monoepoxide, 0.5 ml. water, 10 ml. of methyl alcohol and 50 mgs. of biscarbonyl rhodium chloride dimer (I), $[(Co)_2RhCl]_2$. The mixture was heated to reflux (about 65° C.) for one hour. It was found that there had been produced a 90 percent yield of the unsaturated aldehyde, i.e. 2-butenal.

Example II
A run like that of Example I was carried out using the bis-allyl rhodium chloride dimer (I), $[(allyl)_2RhCl]_2$, as the catalyst, instead of the bis-carbonyl compound. In this experiment the mixture was refluxed (about 65° C.) for 16 hours and a yield of 2-butenal in excess of 80 percent was obtained.

Example III
To the same apparatus as utilized in Examples I and II was added 4 ml. of the butadiene monoepoxide, 0.5 ml. of water, 15 ml. of methyl alcohol and 15 mgs. of tris-triphenyl phosphinerhodium chloride (I)

$$(\phi_3 P)_3 RhCl$$

This mixture was refluxed (65° C.) for 16 hours. A yield in excess of 80 percent of 2-butenal was obtained.

Example IV
To the same apparatus utilized in previous examples was added 1 ml. of the butadiene monoepoxide, 0.5 ml. of water, 4 ml. methyl alcohol and 5 mgs. of rhodium chloride trihydrate (III), $RhCl_3 \cdot 3H_2O$. This mixture was refluxed for about 16 hours and a yield of the 2-butenal in exces of 80 percent was obtained.

In another run 2 ml. of the butadiene monoepoxide, 4 ml. of methanol and 50 mgs. of the rhodium chloride trihydrate were refluxed for about 16 hours and a yield of the 2-butenal in excess of 80 percent was obtained. This shows the use of water is unnecessary.

In a third run 3 ml. of the butadiene monoepoxide with no solvent and 50 mgs. of tris-triphenyl phosphine rhodium chloride (I) catalyst were refluxed for about 16 hours. It was found that the yield of the 2-butenal was about 90 percent and that both geometric isomers were formed. A comparison of these three runs shows that it is unnecessary to utilize a solvent in order to obtain the high yields of 2-butenal.

Example V
A mixture of 2 ml. of butadiene monoepoxide and 50 mgs. of the tris-triphenyl phosphine rhodium chloride (I) catalyst was heated in a pressure bomb at about 70° C. for about 16 hours and a 90 percent yield of 2-butenal was obtained.

Example VI

A mixture of 2 ml. of butadiene monoepoxide and 50 mg. of the tris-triphenyl phosphine rhodium chloride (I) catalyst was allowed to stand at room temperature for 20 hours. A conversion of 10 percent was obtained but all of the product was 2-butenal.

Example VII

Two runs were carried out utilizing in the first run butadiene monoepoxide only with no catalyst and no solvent. No reaction was obtained upon heating at about 65° C. for 16 hours.

In the second similar run methyl alcohol was added to the butadiene monoepoxide but no reaction was obtained. These runs demonstrate the necessity of utilizing a rhodium catalyst in accordance with this invention.

It will be seen from the foregoing examples that the proportion of solvent to butadiene monoepoxide is not critical and, in fact, equally good results are obtained without the use of a solvent. It will also be seen that the proportion of catalyst to butadiene monoepoxide is not critical and need only be a catalytic amount. Amounts from 0.001 mole of rhodium to 1 mole of rhodium per mole of monoepoxide can be used conveniently. Reaction times from 1 hour to about 50 hours have been found to be suitable with the most preferred being from about 1 hour to about 16 hours. It will also be seen from the results obtained with a variety of rhodium catalysts that the particular rhodium compound utilized as the catalyst is not critical.

Butadiene monoepoxide as used herein refers to the compound having the formula

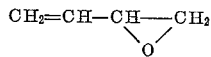

As many possible embodiments can be made of this invention without departing from the broad scope thereof, it is to be understood that all matter herein set forth is to be interpreted as illustrative and not as unduly limiting the invention.

We claim:
1. Method for the production of 2-butenal by contacting butadiene monoepoxide with a catalyst consisting of a rhodium compound selected from the group consisting of rhodium chloride trihydrate (III), discarbonyl rhodium chloride dimer (I), bis-allyl rhodium chloride dimer (I), and tris-triphenyl phosphine rhodium chloride (I), said contacting being in the liquid phase and at a temperature of from 25° C. to 70° C.

2. The method according to claim 1 wherein the contacting is carried out at a temperature between 60° C. and 70° C.

3. The method according to claim 1 wherein the rhodium-containing catalyst is rhodium chloride trihydrate (III).

4. The method according to claim 1 wherein the rhodium-containing catalyst is bis-carbonyl rhodium chloride dimer (I).

5. The method according to claim 1 wherein the rhoduim-containing catalyst is bis-allyl rhodium chloride dimer (I).

6. The method according to claim 1 wherein the rhodium-containing catalyst is tris-triphenyl phosphine rhodium chloride (I).

7. The method according to claim 1 wherein methanol is utilized as a solvent.

8. The method according to claim 1 wherein a mixture of methanol and water is utilized as a solvent.

9. The method according to claim 1 wherein the contacting is carried out at a temperature of from 60° C. to 70° C. with a mixture of methanol and water as the solvent and the rhodium-containing catalyst is rhodium chloride trihydrate (III).

10. The method according to claim 1 wherein the contacting is carried out a temperature of from 60° C. to 70° C. and the rhodium-containing catalyst is tris-triphenyl phosphine rhodium chloride (I).

References Cited

FOREIGN PATENTS 976,101  11/1964  Great Britain.

OTHER REFERENCES

Houben—Weyl, Methoden Der Organ. Chemie, vol. 7, pp. 237–238, 1954.

LEON ZITVER, Primary Examiner

R. H. LILES, Assistant Examiner

U.S. Cl. X.R.

252—431, 441